US010050867B2

(12) United States Patent
Chan et al.

(10) Patent No.: US 10,050,867 B2
(45) Date of Patent: Aug. 14, 2018

(54) METHODS AND SYSTEMS FOR TRANSMITTING BROADCAST DATA

(71) Applicant: Pismo Labs Technology Limited, Hong Kong (HK)

(72) Inventors: Ho Ming Chan, Hong Kong (HK); Kam Chiu Ng, Hong Kong (HK); Yu Yeung, Hong Kong (HK); Kwok Yui Mok, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 482 days.

(21) Appl. No.: 14/421,144

(22) PCT Filed: Oct. 29, 2014

(86) PCT No.: PCT/IB2014/065685
§ 371 (c)(1),
(2) Date: Feb. 11, 2015

(87) PCT Pub. No.: WO2016/067076
PCT Pub. Date: May 6, 2016

(65) Prior Publication Data
US 2017/0250899 A1 Aug. 31, 2017

(51) Int. Cl.
*H04L 12/733* (2013.01)
*H04L 12/46* (2006.01)
(Continued)

(52) U.S. Cl.
CPC .......... *H04L 45/20* (2013.01); *H04L 12/4641* (2013.01); *H04L 12/66* (2013.01);
(Continued)

(58) Field of Classification Search
CPC ..... H04L 45/20; H04L 12/4641; H04L 12/66; H04L 67/16; H04L 69/22; H04L 2212/00
See application file for complete search history.

(56) References Cited

U.S. PATENT DOCUMENTS 5,991,300 A * 11/1999 Tappan .................. H04L 45/50
370/392
6,707,817 B1 * 3/2004 Kadambi ............... H04L 47/50
370/235
(Continued)

FOREIGN PATENT DOCUMENTS

| CN | 101159691 A | 4/2008 |
| WO | 2013044827 A1 | 4/2013 |

OTHER PUBLICATIONS

International Search Report in International Application No. PCT/IB2014/065685, dated Jul. 31, 2015.
(Continued)

*Primary Examiner* — Ricky Quoc Ngo
*Assistant Examiner* — Stephen N Steiner
(74) *Attorney, Agent, or Firm* — Hershkovitz and Associates, PLLC; Abe Hershkovitz

(57) ABSTRACT

The present invention discloses methods and systems for transmitting broadcast data at a communication gateway. When the communication gateway receives a broadcast packet from a host or node, the communication gateway determines whether the broadcast packet satisfies at least one condition. If the broadcast packet satisfies the at least one condition, it is determined whether or not to modify a time to live (TTL) value. The TTL value of the broadcast packet is modified if it is determined to modify the TTL value. The broadcast packet is then forwarded to the destination address of the broadcast packet based on the TTL value. The destination address is reachable through an interconnected network.

15 Claims, 13 Drawing Sheets

(51) Int. Cl.
*H04L 29/06* (2006.01)
*H04L 12/66* (2006.01)
*H04L 29/08* (2006.01)

(52) U.S. Cl.
CPC .............. *H04L 67/16* (2013.01); *H04L 69/22* (2013.01); *H04L 2212/00* (2013.01)

(56) References Cited

U.S. PATENT DOCUMENTS

| | | |
|---|---|---|
| 8,270,302 B2 | 9/2012 | Chu et al. |
| 2002/0163935 A1* | 11/2002 | Paatela .................... H04L 29/06 370/466 |
| 2008/0095059 A1* | 4/2008 | Chu ........................ H04L 12/66 370/238 |
| 2012/0307631 A1* | 12/2012 | Yang ..................... H04L 47/127 370/230 |
| 2013/0340067 A1* | 12/2013 | Lindteigen .......... H04L 63/0272 726/15 |
| 2014/0310811 A1* | 10/2014 | Hentunen ........... H04L 63/1441 726/23 |

OTHER PUBLICATIONS

Written Opinion of the international Searching Authority in International Application No. PCT/IB2014/065685, dated Jul. 31, 2015.

\* cited by examiner

METHODS AND SYSTEMS FOR TRANSMITTING BROADCAST DATA

TECHNICAL FIELD

The present invention relates in general to the field of computer networks. More particularly, the present invention relates to methods carried out by a communication gateway for transmitting broadcast data to nodes or hosts reachable through interconnected networks.

BACKGROUND ART

Bonjour is a zero configuration network multicast Domain Naming System protocol used by devices developed by Apple Inc. to enable the automatic and easy discovery of computers, devices, and services on Internet Protocol (IP) networks. Bonjour (like other multicast services, such as Microsoft's UPnP) uses industry standard IP protocols to allow devices to automatically discover each other without the need to enter IP addresses or configure DNS servers. This brings simplicity and ease-of-use to the users of network devices and services Eliminating the need to set up services such as Dynamic Host Configuration Protocol, DNS, and DNS Service Directory, Bonjour enables each device to continuously publish and discover services. By broadcasting Bonjour service messages, printers, servers, and other shared devices can advertise the services they offer. Client devices then monitor Bonjour advertisements and connect to the appropriate servers, as with any other service. The protocol also allows for a device to request services (Service Discovery) on the network as well as respond to incoming requests. A single device can be both a client and a server at the same time. The automatic discovery makes it easy for clients to easily use services offered by another device or server.

On the downside, Bonjour generates a lot of network traffic. During the Service Discovery process, when a device is browsing for services, it sends queries to discover whether a particular service is available in a network or in a domain. It issues an initial query and then sends subsequent queries exponentially less often, after 1 second, 2 seconds, 4 seconds, 8 seconds, and so on, at up to a maximum interval of one hour. Likewise, when a service starts up on the network, it announces its presence with the same exponential back-off algorithm. In a network that are connected through public networks, private networks, tunnels, or virtual private networks (VPN) the amount of such traffic can be substantial. With hundreds or thousands of Apple clients on a network, multicast traffic quickly swells to startling percentages.

The other problem with Bonjour (and similar multicast services) is that the broadcast of service advertisements are only seen by devices within a single subnet or Virtual Local Area Network (VLAN). Therefore in an enterprise with a large multi-VLAN network, the Bonjour traffic will not span across VLANs. This means Bonjour devices like printers in one VLAN cannot be used by client device in another VLAN.

As a result, when two networks are connected together or when one host is connected to another network through IP based tunnel, multicast data, such as data from Bonjour Protocol, are usually blocked in order to reduce network traffic. The blocking of this multicast data creates inconvenience to users and hosts as users and hosts are unable to receive multicast data originated from another network.

Internet Engineering Task Force (IETF) Request For Comments (RFC) 6513 has disclosed a method to relay IP based multicast data to different networks through tunnels and/or MPLS technologies. IETF RFC 6513 specifies special protocols and procedures how multicast traffic within a BGP/MPLS IP VPN travels from one VPN site to another.

Cisco has disclosed a Bonjour Gateway, by caching Bonjour advertisements from one or more source/host and responding back to Bonjour clients when the Bonjour clients ask for or request a service. The solution disclosed by Cisco requires the Bonjour Gateway to understand Bonjour protocol in order to cache Bonjour traffic and make request or reply on behalf of other Bonjour protocol capable devices. The Bonjour Gateway acts like a proxy.

Another method is to use specifically configured DNS server to provide IP based multicast data to different networks. However, not all networks are allowed to have specifically configured DNS server.

If the multicast data-link layer data is non-discriminatorily being transmitted, routed or forwarded from one network to another network, the capacity of the tunnel may be consumed by the multicast data-link layer data. Therefore, intelligent methods are required to be implemented at the gateway or router in order to allow multicast data being transmitted, routed or forwarded discriminatorily while not consuming too much network resources.

DISCLOSURE OF INVENTION

Summary of Invention

The present invention discloses methods and systems for transmitting broadcast data at a communication gateway. The communication gateway first receives a broadcast packet comprising broadcast data from a host or node. The communication gateway then determines whether the broadcast packet satisfies at least one condition. If the broadcast packet satisfies the at least one condition, communication gateway determines whether or not to modify a time to live (TTL) value of the broadcast packet. If it is determined to modify the TTL value, the TTL value is modified, and the communication gateway then forwards the broadcast packet based on the TTL value. The destination address may be reachable through an interconnected network, such as the Internet.

According to one of the embodiments of the present invention, the at least one condition is based on one or more of source address, destination address, and port number of the broadcast packet.

According to one of the embodiments of the present invention, the communication gateway encapsulates the broadcast packet in an Internet Protocol (IP) packet before forwarding the broadcast packet to the destination address.

According to one of the embodiments of the present invention, the broadcast packet comprises broadcast data such as a service advertisement, a service request, a response to a service request, a response to a service advertisement, a presence indicator, and a message.

According to one of the embodiments of the present invention, the communication gateway determines to modify the TTL value if the TTL of the broadcast packet has expired or is about to be expired.

According to one of the embodiments of the present invention, if the broadcast packet satisfies the at least one condition, the communication gateway may also modify other fields of the broadcast packet before forwarding the broadcast packet. The other fields that may be modified comprise at least one of destination address and source address of the broadcast packet.

According to one of the embodiments of the present invention, the broadcast packet is forwarded through an aggregated virtual private network (VPN) connection.

The present invention further discloses methods and systems for transmitting broadcast data at a communication gateway, wherein the method comprises the steps of: receiving a broadcast packet from a host or a node and determining whether the broadcast packet satisfies at least one condition. When the broadcast packet does not satisfy the at least one condition, the communication gateway forwards the broadcast packet to its destination regardless of the TTL value of the broadcast packet. Alternatively, when the broadcast packet satisfies the at least one condition, the communication gateway determines whether or not TTL of the broadcast packet has expired. The broadcast packet is then forwarded if the TTL has not expired. If the TTL has expired, the broadcast packet is not forwarded.

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program code, code segments or instruction codes to perform the necessary tasks may be stored in a machine readable medium such as storage medium. A processing unit(s) may perform the necessary tasks. A processing unit(s) can be a CPU, an ASIC semi-conductor chip, a semi-conductor chip, a logical unit, a digital processor, an analog processor, a FPGA or any processor that is capable of performing logical and arithmetic functions. An instruction code may represent a procedure, a function, a subprogram, a program, a routine, a subroutine, a module, a software package, a class, or any combination of instructions, data structures, or program statements. An instruction code may be coupled to another instruction code or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface can be a virtual network interface, including a virtual network interface in a cloud based instance.

FIG. 1 illustrates system 100 adapted according to one of the embodiments of the present invention. System 100 includes multiple sites 102 and 104, which each comprise at least one communications gateway 106 and 108. Communications gateway 106 and 108 may be embodied as multi WAN routers which support aggregating the bandwidth of multiple Internet connections, as single WAN which support aggregating the bandwidth of multiple Internet connections and/or as single WAN which does not support aggregating the bandwidth of multiple Internet connections. Communications gateway 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and communication gateway 106 may comprise M connections 112, and site 104 and communication gateway 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. M connections 112 and N connections 114 may have similar or differing bandwidth capabilities. Further, connections 112 and 114 may comprise different types of WAN connections, such as a Wi-Fi, cable, DSL, T1, 3G, 4G, satellite connections, and the like. It is also noted that site 102 and site 104 may be thought of as both a sender and receiver, and discussions regarding the functionality of either site may be implemented on the other site. In other words, system 100 may be implemented as a symmetrical network. N connections 114 are established through one or more of the plurality of network interfaces 606.

Communication gateways 106 and 108 are connected through M×N tunnels 116. M×N tunnels 116 are established using M connections 112 and N connections 114. There is no limitation on the value of M or N. In one variant, the number of tunnels established between communication gateways 106 and 108 can be more or fewer than M times N. For illustration, if M is equal to 3 and N is equal to 2, the number of tunnels established between communication gateways 106 and 108 can be one, ten or any number. Preferably, the number of tunnels established should be within the computing and networking resources that communication gateways 106 and 108 are able to operate with impacting performance negatively.

Server 121 is capable of providing a service to at least one host. The service may include multimedia streaming, data distribution, content distribution, multimedia data collection, video broadcasting, video multicasting, audio broadcasting, audio multicasting, game streaming, game hosting, application hosting, application distribution, encoding, decoding, directory, and any other service that a host may need. Server 121 broadcasts its service capability to hosts and nodes that are located within the same local network, such as site 104, by sending out service advertisement 131 to the local network. When communication gateway 108 receives service advertisement 131 from server 121 through a network interface connecting to the local network, it forwards service advertisement 132 to communication gateway 106 using one of N connections 114 established over another network interface if it determines to. Service advertisement 132 is based on service advertisement 131. One or more packets containing service advertisement 132 reaches communication gateway 106 through using one of M×N tunnels 116 and one of M connections 112.

When communication gateway 106 receives service advertisement 132, it forwards another service advertisement 133 to one or more local area network it connects to. Optionally, communication gateway 106 determines whether or not to forward the service advertisement based on one or more conditions or policies. Service advertisement 133 is based on service advertisement 132. When a host or a node, such as display 122 wants to subscribe to the service, display 122 sends response 141 to server 121. Response 141 may contain information necessary for subscribing to the service advertised in service advertisement 133, including identification information, security information, service request information, service termination information, location information and payment information. Display 122 may transmit response 141 as a unicast message, a multicast message or a broadcast message.

Communication gateway 106 receives response 141 as response 141 is either designated for server 121 or multicast/broadcast to the same local network that communication gateway 106 connects to. After communication gateway 106 receives response 141, it forwards response 142 to communication gateway 108. One or more packets containing response 142 reaches communication gateway 108 through using one of M×N tunnels 116 and one of M connections 112 and one of N connections 114. Response 142 is based on response 141.

When communication gateway 104 receives response 142, it forwards another response 143 to server 121. Response 143 is based on response 142. Server 121 can then process response 143 to determine the suitable actions to be performed for display 122.

Similarly, display 122 may broadcast service request. When communication gateway 106 receives the service request through a network interface that is connecting to site 102, it determines whether or not to forward the service request to communication gateway 108 based on at least one condition. If communication gateway 106 determines to forward the service request, it forwards the service request through one of the M×N tunnels established between communication gateways 106 and 108. When communication gateway 108 receives the service request, it broadcasts the service request to site 104. Alternatively, communication gateway 108 only forwards the service request to server 121 if communication gateway 108 is able to recognize that server 121 should be recipient of the request. Alternatively, communication gateway 108 does not broadcast the service request to site 104 or forwards the service request to server 121 if it determines to. This may happen if communication gateway 108 cannot confirm the authenticity of the service request, cannot confirm the integrity of service request, does not have resources, determines that the service request fails a condition, determines that the service request fails a condition, determines that the service request has not satisfied at least one condition or determines that a policy is satisfied.

FIG. 6 is an illustrative block diagram of a communications gateway, such as communication gateway 108, according to one of the embodiments of the present invention. Communications gateway 108 comprises processing unit 602, main memory 603, system bus 604, secondary storage 605, and plurality of network interfaces 606. Processing unit 602 and main memory 603 are connected to each other directly. System bus 604 connects processing unit 602 directly or indirectly to secondary storage 605, and plurality of network interfaces 606. Using system bus 504 allows communication gateway 106 to have increased modularity. System bus 604 couples processing unit 602 to secondary storage 605, and plurality of network interfaces 606. System bus 604 can be any of several types of bus structures including a memory bus, a peripheral bus, and a local bus using any of a variety of bus architectures. Secondary storage 605 stores program instructions for execution by processing unit 602. Secondary storage 605 further stores condition(s) for deciding whether broadcast data should be forwarded through the plurality of network interfaces 606 according to one of the embodiments. In one of the embodiments, the block diagram of FIG. 6 can also represent the system of communication gateway 106.

FIG. 2A is a flow-chart illustrating a process showing how communication gateway 108 forwards service advertisement 132 in details according to one of the embodiments.

When communication gateway 108 receives a frame or packet containing broadcast data at step 201, processing unit 602 determines whether the broadcast data satisfies at least one condition at step 202. The broadcast data can be a service advertisement, a service request, and a response to a service request, a response to a service advertisement, a presence indicator, a message, or any kind of data that are destined for more than one recipient. For easy reading, broadcast data here also refers to multicast data, such that this invention also applies to multicast data. Unless specifically stated, broadcast data is also considered as multicast data hereunder.

When the broadcast data has satisfied the at least one condition at step 202, communication gateway 108 then forwards the broadcast data at step 203. If the broadcast data has not satisfied the at least one condition at step 202, communication gateway 108 then does not forward any broadcast data at step 204.

Step 202 is used to filter out broadcast data that is not intended to be forwarded to communication gateway 106. Without filtering out unwanted broadcast data, network capacity and resources can be consumed by the unwanted broadcast data significantly. There could be one or more conditions to determine what kinds of broadcast data can be forwarded. For illustration purpose, in one example, a condition is to only forward Bonjour protocol broadcast data. Communication gateway 108 only forwards broadcast data using Bonjour protocol to communication gateway 106. Communication gateway 108 examines the destination IP address and port number of IP packets it receives to determine whether the IP packets hold Bonjour protocol broadcast data. For example, the port number for Bonjour protocol is 5353 and the transmission protocol can be TCP or UDP.

In another illustration, there are two conditions. The first condition is to allow video streaming broadcast data based on the source IP address of the broadcast data and the second condition is to allow broadcast data used for management based on the content carried by the broadcast data. When communication gateway 108 intercepts or receives a frame or packet containing broadcast data, communication gateway 108 examines the source address of the broadcast data, port number of the broadcast data if the broadcast data is sent using Internet Protocol, and/or the content of broadcast data by using content examination techniques, such as deep packet inspection, and header of the content to determine whether the broadcast data satisfy any of the two conditions.

According to one of the embodiments of the present invention, a condition is stored by communication gateway 108 in secondary storage 605. Alternatively, the condition is retrieved from a remote server including a server stored in an intranet, extranet, a third-party service provider, a cloud computing service provider or a virtualized server.

FIG. 2B is a flow-chart illustrating a process showing how communication gateway 108 forwards service advertisement 132 in details according to one of the embodiments. The difference between FIG. 2A and FIG. 2B is that step 203 is replaced with step 205. At step 205, broadcast data is forwarded by a communication gateway according to at least one policy. A policy determines how communication gateway forwards broadcast data. For illustration purpose, a condition used at step 202 is based on port number of the broadcast protocol of the broadcast data. The first policy step up by an administrator or the manufacturer of communication gateway 108 at step 205 is to allowed broadcast data be transmitted through M×N tunnels 116 only during a certain period of time, for example, before 8 a.m. and after 6 p.m. The second policy is to allow broadcast data be transmitted through M×N tunnels 116 by a host with a specified IP address anytime. Such that, the capacity of M×N tunnels 116 is not consumed by broadcast data during office hour while broadcast data belonging to the host with the specified IP address still passes through M×N tunnels 116 regardless of the time. The transmission of the broadcast data to or by the host is then not affected by the first condition.

According to one of the embodiments of the present invention, a policy used at step 205 is based on the capacity of M×N tunnels 116. When the available capacity of M×N tunnels 116 has used to a threshold, broadcast data is not transmitted through M×N tunnels 116 in order to preserve capacity of M×N tunnels 116 even the condition at step 202 is satisfied. In one variant, instead of not blocking all broadcast data, a portion of the broadcast data is still allowed to be transmitted through M×N tunnels 116. For illustration, half of broadcast data is dropped by a communication gateway when thirty percent of bandwidth capacity of M×N tunnels 115 has already been used by other non-broadcast data traffic.

According to one of the embodiments of the present invention, a policy used at step 205 is to determine which one or more tunnels of M×N tunnels 116 is used to transmit broadcast data. For illustration purpose, a policy is set to forward Bonjour Protocol based broadcast data through all M×N tunnels 116 and to forward broadcast Address Resolution Protocol (ARP) messages through one of M×N tunnels 116. This policy may help to allow Bonjour Protocol based broadcast data be delivered faster than the broadcast ARP messages. This implies that Bonjour Protocol based broadcast data has a higher priority over broadcast ARP messages.

According to one of the embodiments of the present invention, the policy is stored by communication gateway 108 in secondary storage 605. Alternatively, the policy is retrieved from a remote server including a server stored in an intranet, extranet, a third-party service provider, a cloud computing service provider or a virtualized server.

FIG. 3A, FIG. 3B, FIG. 3C and FIG. 3D illustrate structures of broadcast data at different stages of the processes in FIG. 2. According to one of the embodiments of the present invention illustrated in FIG. 3A, when server 121 first sends out broadcast data 301, such as service advertisement 131, broadcast data 301 is contained in IP packet 302, a network layer packet, and IP packet 302 is contained in Ethernet frame 303, a data-link layer frame. After communication gateway 108 has received Ethernet frame 303 in step 201, processing unit 602 determines whether broadcast data 301 satisfies at least one condition in step 202. In one variant, in step 202, processing unit 602 only examines the port number of IP packet 302 to determine whether broadcast data should be forwarded or not. In one variant, in step 202, processing unit 602, according to the condition(s), examines Ethernet frame 303 to determine whether broadcast data should be forwarded or not. In one variant, in step 202, processing unit 602, according to the condition(s), examines broadcast data 301 to determine whether broadcast data should be forwarded or not. In one variant, processing unit 602, according to the condition(s), examines two or all of IP packet 302, Ethernet frame 303 and broadcast data 301 to determine whether broadcast data should be forwarded or not. The more detailed examinations are carried out, the lower probability that communication gateway 108 forwards unnecessary broadcast data or forgery data to communication gateway 106. The fewer detailed examinations are carried out; the lower computing resources are required.

When communication gateway 108 forwards broadcast data 301 to communication gateway 106, there are two embodiments how communication gateway 108 forwards broadcast data 301.

The first embodiment is that communication gateway 108 encapsulates Ethernet frame 303 in encapsulating IP packet(s) 304 as illustrated in FIG. 3B and then transmits encapsulating IP packet(s) 304 to communication gateway 106. After communication gateway 106 has received encapsulating IP packet(s) 304, it decapsulates encapsulating IP packet(s) 304 to retrieve Ethernet frame(s) 303 and then broadcasts Ethernet frame(s) 303 to the local area network(s) it connects to. Hosts and nodes in the local area network(s) can then determine whether to respond to broadcast data 301 contained in IP packet(s) 302. One of the benefits of this embodiment is that communication gateway 108 directly encapsulates Ethernet frame(s), such that communication gateway 106 and 108 together work act as an Ethernet bridge. Another one of the benefits of this embodiment is not to involve routing. This greatly reduces the load of communication gateways 106 and 108. Another benefit is to support multiple network layer protocols, such as IP, IPS, and SNA. Therefore broadcast data 301 can be encapsulated by network layer protocols, including IP.

In one variant, the first embodiment is used when communication gateway 108 and communication gateway 106 are connected through a layer two virtual private networks (L2VPN) technology. In one variant, communication gateway 106 uses Ethernet frame(s) 305 to broadcast IP packet(s) 302, instead of using Ethernet frame(s) 303, as illustrated in FIG. 3D. The major difference between Ethernet frame 303 and Ethernet frame 305 is the source address of the Ethernet frame. The source address of Ethernet frame 305 is the Ethernet address of communication gateway 106.

The second embodiment is to encapsulate IP packet(s) 302 in encapsulating IP packet(s) 304 as illustrated in FIG. 3C. As communication gateway 108 receives Ethernet frame(s) 303 from server 121, communication gateway 108 retrieves IP packet(s) 302 from Ethernet frame(s) 303 and then transmit encapsulating IP packet(s) 304 to communication gateway 106. After communication gateway 106 has received encapsulating IP packet(s) 304, it decapsulates encapsulating IP packet(s) 304 to retrieve IP packet(s) 302, then broadcasts IP packet(s) 302 to the local area network(s) it connects to. Hosts and nodes in the local area network(s) can then determine whether or not to respond to broadcast data 301 contained in IP packet(s) 303. One of the benefits of this embodiment is that size of encapsulating IP packet(s) 304 is smaller than the size of encapsulating IP packet(s) 304 in the first embodiment illustrated in FIG. 3B, because there is no need to contain Ethernet frame 303. Another benefit is that transmission is not bound by limitation of Ethernet protocol or other data link network protocols. For example, the round trip time limit of Ethernet can be avoided in this embodiment.

In one variant, the second embodiment is used when communication gateway 108 and communication gateway 106 are connected through a layer three tunnel; such that the local area networks connected to communication gateway 106 and 108 respectively are being considered as in the same virtual private network (VPN).

According to one of the embodiments of the present invention, M×N tunnels 116 are established by communication gateways 106 and 108 using one of layer two virtual private network (L2VPN) protocols. Broadcast data that satisfies at least one condition can be transmitted through one or more of M×N tunnels 116. There are myriad ways for communication gateway 108 to establish L2VPN, including using Multiprotocol Label Switching (MPLS), Asynchronous Transfer Mode (ATM) and Frame Relay.

According to one of the embodiments of the present invention, M×N tunnels 116 are established by communication gateways 106 and 108 using one of IP virtual private network protocols. Broadcast data that satisfies at least one condition can be transmitted through one or more of M×N tunnels 116. There are myriad ways for communication gateway 108 to establish IP based M×N tunnels 116, including using Internet Protocol Security (IPsec), Transport Layer Security (SSL/TLS), Secure Shell (SSH), PepVPN and SpeedFusion.

According to one of the embodiments of the present invention, regardless whether M×N tunnels 116 are established using layer two VPN protocols or layer three VPN protocols, broadcast data is transmitted using one or more the M×N tunnels 116. In one variant, when one or more of M×N tunnels is broken and cannot be used, communication gateways 106 and 108 stop using the broken tunnels to transmit broadcast data. In one variant, when an IP packet(s) containing broadcast data is dropped or lost in of M×N tunnels 116, the transmitting communication gateway will retransmit the broadcast data in another IP packet(s) through another of M×N tunnels 116. In one variant, duplicated broadcast data is transmitted by communication gateway 108 using a plurality of M×N tunnels 116. The receiving communication gateway 106 forwards the first received broadcast data of the duplicated broadcast data to the local area network(s) it connects to and discards others of the duplicated broadcast data. This results in not only higher availability, but also faster delivery.

In one variant, only a first group of M×N tunnels 116 are used to transmit broadcast data and other non-first groups M×N tunnels 116 are not used to transmit broadcast data. Unicast data that are responses to the broadcast data are not restricted to be transmitted through the first group or any of M×N tunnels 116 unless the administrator or manufacturer of the transmitting communication gateway explicitly created network policies to do so. The use of the first group allows network traffic management for the broadcast data. For illustration purpose, an administrator can assign higher priorities to broadcast data, such that broadcast data can only be transmitted using one or more high speed M×N tunnels 116. In another illustration, a manufacture can pre-configure a transmitting communication gateway, such as communication gateway 108, to use a low-cost access link to transmit broadcast data and therefore only tunnels being carried by the low-cost access link belong to the first group of M×N tunnels 116.

In one variant, a second group of M×N tunnels 116 are not used to transmit broadcast data and other non-first group M×N tunnels 116 are allowed to be used for transmitting the broadcast data. To restrict a few tunnels of M×N tunnels 116 from being used ensures that the broadcast data does not consume bandwidth of the few tunnels, which could be reserved for other network traffic.

The policies or configuration to determine which of M×N tunnels 116 can be used or are not allowed to carry broadcast data are stored in secondary storage 605 of communication gateways 108. The policies or configuration can also be stored in a secondary storage of communication gateway 106. In one variant, the policies or configurations can be retrieved by a remote server, including a server stored in an intranet, extranet, a third-party service provider, a cloud computing service provider or a virtualized server.

FIG. 4 illustrates system 400 adapted according to embodiments configured to allow broadcast data transmitted by communication gateway 106 to be transmitted to communication gateway 401 and broadcast data transmitted by communication gateway 401 to be transmitted to communication gateway 106 through communication gateway 108. System 400 is configured as a hub architecture, such that communication gateway 108 acts as the broadcast data hub. As in FIG. 1, communication gateways 106 and 108 are connected through M×N tunnels 116. Communication gateway 106 has one access link 112-1 to connect to interconnected network 110. Access link 112-1 carries two M×N tunnels 116 inside. Communication gateway 401 has two access links 402-1 and 402-2 to connect to interconnected network 110. Communication gateways 108 and 401 are connected through Y×Z tunnels 411. There is no tunnel directly connecting communication gateways 106 and 401.

When a server, located in a local area network that communication gateway 106 is connecting to, transmits broadcast data, communication gateway 106 forwards the broadcast data to communication gateway 108 if the broadcast data satisfies at least one first condition. When communication gateway 108 receives the broadcast data, it will perform two tasks. The first task is to forward the broadcast data to the local area network it connects to, as discussed in other embodiments. The second task is to decide whether to forward the broadcast data to communication gateway 401. According to one of the embodiments of the present invention, processing unit 602 of communication gateway 108 makes the decision to forward or not to forward the received broadcast data according to at least one second condition. The at least one second condition can be the same as, based on, or different from the at least one first condition at communication gateway 106. The at least one second condition is similar to the at least one condition at step 205. Therefore, when communication gateway 108 receives broadcast data from communication gateway 106, communication gateway 108 goes through the same step in FIG. 2A. In one variant, communication gateway 108 forwards the broadcast data to communication gateway 401 without deciding whether the broadcast data satisfies at least one second condition and it forwards all broadcast data originated from communication gateway 106 to communication gateway 401.

In one variant, the second task deciding whether to forward the broadcast data to communication gateway 401 is based on at least one second policy. The at least one second policy is similar to the at least one policy at step 205. Therefore, when communication gateway 108 receives broadcast data from communication gateway 106, communication gateway 108 goes through the same step in FIG. 2B.

The benefits of using hub architecture as illustrated in FIG. 4 and using a plurality of tunnels include centralization of broadcast data distribution and higher availability as communication gateway is capable of duplicating broadcast data and transmitting broadcast data through a plurality of tunnels. When one of the plurality of tunnels is not working properly, such as experimenting large number of packet drops, the remaining tunnels can still carry the broadcast data between two communication gateways. Also, for illustration, if access-link 114-2 is not performing satisfactorily, communication gateway 108 can still rely on access-link 114-1 to receive from communication gateway 106 and forward the broadcast data to communication gateway 401. Centralization of broadcast data distribution, for example, allows administrator of the system 400 to control what can be and what cannot be distributed in system 400 by controlling communication gateway 108, which is acting as a hub.

FIG. 5 illustrates system 500 adapted according to embodiments configured to allow broadcast data transmitted by communication gateway 106 to be transmitted to communication gateway 401 and broadcast data transmitted by communication gateway 401 to be transmitted to communication gateway 106 through communication gateway 108 as in system 400. Furthermore, communication gateways 106 and 401 can transmit and receive broadcast data to and from each other directly through tunnels 501 without passing through communication gateway 108. Therefore, system 500 is configured as a star architecture.

The benefits of star architecture over hub architecture for transmitting and receiving broadcast data includes reducing the time and computing resources required by using a hub to forward broadcast data. However, additional tunnels are required to be established among all the communication gateways, such as tunnels 501.

According to one of the embodiments of the present invention, a communication gateway forwards and/or retransmits broadcast data when tunnels between other communication gateways are broken. Using FIG. 5 for illustration, broadcast data originated from a first server, which uses communication gateway 401 as a gateway to distribute broadcast data, reaches other hosts or nodes accessible through tunnels 411 via communication gateway 108 and through tunnels 501 via communication gateway 106 respectively. If all tunnels 501 are broken, broadcast data from the first server cannot reach communication gateway 106 through tunnels 501. Communication gateway 401 then alerts communication gateway 108 about broken tunnels 501. Communication gateway 108 then forwards broadcast data originated from the first server to communication gateway 106 through tunnels 116. In one variance, when all tunnels 501 are broken and one of tunnels 116 is broken, communication gateway 108 is still able to use remaining tunnels of tunnels 116 to forward broadcast data originated from the first server to communication gateway 106.

According to one of the embodiments of the present invention, broadcast data are transmitted using balancing technique. Using FIG. 1 for illustration, broadcast data belonging to a first data stream originated from server 121 are distributed among all M×N tunnels 116 to reach communicate gateway 106. This avoids reliance on one particular tunnel.

It may be known to those skilled in the arts that broadcast packets or multicast packets belonging to most protocols have a destination broadcast address or destination multicast address in the same local area network (LAN) or virtual LAN (VLAN) as the source. The packets may be destined to one or more link-local addresses. Generally, according to prior art, routers may not forward packets that has a link-local address as the destination address. Time to live (TTL) value of broadcast packets and multicast packets may thus be set to 1 in some protocols. When TTL value of a packet is set to 1, the packet may not be forwarded by routers, as TTL expires.

FIG. 7 is a flowchart illustrating a process according to one of the embodiments of the present invention. A broadcast packet is received at communication gateway 108 in step 201. If it is determined in step 202 that the broadcast packet received at communication gateway 108 satisfies at least one condition, processing unit 602 performs step 701. In step 701, processing unit 602 determines whether or not to modify TTL value of the broadcast packet. If processing unit 602 determines not to modify TTL, the broadcast packet is forwarded to its destination address in step 203 if TTL has not expired. Alternatively, if processing unit 602 determines to modify the TTL value, the TTL value is modified in step 702 and checksum of the IP header of the broadcast packet may be updated accordingly. The broadcast packet is then forwarded to the destination in step 203 as TTL value has been modified and not expired.

For illustration purpose, when the TTL value of the broadcast packet is one, processing unit 602 may determine to modify TTL value of the broadcast packet to be two, so that the communication gateway 108 can forward the broadcast packet to a destination which may be reachable through network 110. The TTL value may be increased. In one variant, processing unit 602 forwards the broadcast packet without checking whether TTL value is one or the TTL has expired. In one variant, processing unit 602 increases the TTL value by one or more before forwarding the broadcast packet. In one variant, processing unit maintains the TTL value and forward the broadcast packet. Those who skilled in the art would appreciate that different protocols may use different TTL value to determine whether the time to live for a broadcast packet is reached. For example, a broadcast packet may considered to be expired if its TTL value is 255 and a communication gateway may decrease the TTL value, instead of increasing the TTL value, before forwarding the packet.

In one variant, in step 203, the broadcast packet is forwarded according to at least one policy. A policy determines how communication gateway 108 forwards broadcast data, as discussed in step 205 of FIG. 2B.

In step 202, the at least one condition may be based on one or more of source IP address, destination IP address, and port number. For illustration purpose, a first condition is based on the destination IP address. Processing unit 602 examines the destination IP address to determine whether the broadcast packet should be forwarded. For example, manufacturer of communication gateway 108, a user and/or administrator may define a specific destination IP address, such that only packets destined to the specific destination IP address may be forwarded, and packets destined to any other destination IP address are not forwarded. In another example, manufacturer of communication gateway 108, a user and/or administrator may define a specific source IP address, such that only packets originating from the specific source IP address may be forwarded, and packets originating from any other source IP address are not forwarded. In another example, manufacturer of communication gateway 108, a user and/or administrator may define a specific port number, such that only packets with the specific port number may be forwarded, and packets with any other port numbers are not forwarded.

In step 701, processing unit 602 may determine whether or not to modify the TTL value of the broadcast packet based on one or more factors. For example, processing unit 602 first determines the TTL value. If the TTL value is 1, processing unit 602 determines to modify the TTL value. The TTL value is then increased in step 702, and the packet checksum is updated accordingly. Alternatively, if the TTL value is determined to be higher than 1, processing unit 602 determines not to modify the TTL value, and forwards the broadcast packet in step 203.

In another example, processing unit 602 determines to modify the TTL value if the TTL has expired. If the TTL has not yet expired when the broadcast packet arrives at communication gateway 108, processing unit 602 determines not to modify the TTL value in step 701 and forwards the broadcast packet in step 203.

In another example, processing unit 602 determines to increase the TTL value if the TTL has expired or is about to be expired. For example, when the TTL is about to be expired, processing unit 602 may increase the TTL value to a large value, so that the broadcast packet is capable of being forwarded to its destination before the TTL expires. As there may be a number of hops in the route between communication gateway 108 and the destination of the broadcast packet, the TTL value may be increased accordingly. If the TTL value is too low, the broadcast packet may not be forwarded by a network node in the route.

In another example, processing unit 602 determines whether or not to modify the TTL value according to a policy set by a user or administrator of communication gateway 108. If the policy is to ignore the TTL regardless of the TTL value of the broadcast packet when it arrives at communication gateway 108, processing unit 602 determines not to modify the TTL value and forwards the broadcast packet in step 203. Alternatively, if the policy is to modify the TTL value, processing unit 602 modifies the TTL value in step 702.

Steps 701 and 702 may be performed for modifying any other field in the broadcast packet, and is not limited to modifying the TTL value. For example, processing unit 602 may modify other fields such as source IP address, destination IP address, etc., in order to allow the broadcast packet to be transmitted using IP through network 110. Values may also be modified to allow the broadcast packet to be transmitted through a layer-3 VPN.

In one example, if the destination IP address is a broadcast address, processing unit 602 may modify the destination IP address to be the IP address of one or more of the hosts or nodes in the subnet corresponding to the broadcast address. Processing unit 602 may also make copies of the broadcast packet, and modify the destination IP address of the copies of the broadcast packet to be the IP address of other hosts or nodes in the subnet respectively. This may allow the broadcast not to be forwarded to all members of the subnet.

For illustration purpose, FIG. 7 is discussed in accordance with FIG. 1. A broadcast data, such as service advertisement 131 is sent from server 121. Service advertisement 131 may be comprised in one or more broadcast packets. The broadcast packets may be layer-2 packets, such as Ethernet frame 303. When communication gateway 108 receives Ethernet frame 303, it decapsulates IP packet 302 from Ethernet frame 303. Processing unit 602 determines in step 202 whether at least one condition is satisfied by IP packet 302. If the at least one condition is not satisfied, step 204 is performed and IP packet 302 is not forwarded. If the at least one condition is satisfied, processing unit 602 determines whether or not to modify the TTL value of IP packet 302. For example, if the TTL value is 1, processing unit 602 may increase the TTL value to a higher value in step 702 so that IP packet 302 may be transmitted to communication gateway 106 before the TTL expires. The packet checksum of IP packet 302 may be updated accordingly. IP packet 302 may then be encapsulated in encapsulating packet 304 by processing unit 602. M×N tunnels 116 may be aggregated to form an aggregated VPN connection. M×N tunnels 116 may be established using Layer-3 VPN technology. The aggregated VPN connection may be utilized for obtaining combined bandwidth of M×N tunnels 116. Since IP packet 302 needs to be sent through the aggregated VPN connection, IP packet 302 is first encapsulated in encapsulating packet 304 and then encapsulating packet 304 is transmitted through the aggregated VPN connection to communication gateway 106 in step 203. One of the purposes for encapsulating the packets inside encapsulating packets is to facilitate reordering the packets when the encapsulating packets are received at the other end of the aggregated connection, as the encapsulating packets may arrive out of order. The destination address of IP packet 302 may be a broadcast IP address or a multicast IP address. For example, when IP packet 302 may be destined to one or more nodes or hosts in an IP multicast group, the destination IP address of IP packet 302 may be IP multicast group address of the IP multicast group. The IP multicast group address is reachable through communication gateway 106, and the one or more nodes or hosts in the IP multicast group are also reachable through communication gateway 106. The destination IP address of encapsulating packet 304 is the IP address of communication gateway 106. When communication gateway 106 receives encapsulating packet 304 through the aggregated VPN connection, it decapsulates encapsulating packet 304 to retrieve IP packet 302. IP packet 302 is then forwarded to its destination IP address, which may be the IP multicast group IP address. Such that, the one or more nodes or hosts in the IP multicast group may then receive copies of IP packet 302 from communication gateway 106. In one variant, if the destination IP address is the broadcast address of a subnet, communication gateway 106 sends IP packet 302 to all hosts in the subnet.

FIG. 8 is a flowchart illustrating a process according to one of the embodiments of the present invention. When communication device 108 receives a broadcast packet in step 201, processing unit 602 determines whether the broadcast packet satisfies at least one condition in step 202. If the broadcast packet does not satisfy the at least one condition, processing unit 602 determines to ignore the TTL value in step 801 and forwards the broadcast packet in step 203.

Alternatively, if the broadcast packet satisfies the at least one condition, processing unit determines not to ignore the TTL value in step 802. In step 803, processing unit 602 determines whether TTL has expired. If TTL has not expired, the broadcast packet is forwarded to the destination in step 203. The broadcast packet is not forwarded to the destination in step 204. In one example, the at least one condition in step 202 may be based on a policy set by the user and/or administrator of communication gateway 108.

For illustration purpose, FIG. 8 is discussed in accordance with FIG. 1. A broadcast data, such as service advertisement 131 is sent from server 121. Service advertisement 131 may be comprised in one or more broadcast packets. The broadcast packets may be layer-2 packets, such as Ethernet frame 303. When communication gateway 108 receives Ethernet frame 303, it decapsulates IP packet 302 from Ethernet frame 303. Processing unit 602 determines in step 202 whether at least one condition is satisfied by IP packet 302. If the at least one condition is not satisfied, processing unit 602 determines to ignore the TTL, i.e., the TTL value of IP packet 302 is not modified, and IP packet 302 is forwarded in step 203 regardless of whether the TTL has expired or not. Alternatively, if the at least one condition is satisfied, the TTL value is not ignored in step 802. For example, the at least one condition may be based on the source IP address, destination IP address, and/or port number indicated in IP packet 302. In step 803, processing unit 602 determines whether or not the TTL of IP packet 302 has expired. If TTL has expired, IP packet 302 is not forwarded in step 204. If the TTL has not expired, IP packet 302 is first encapsulated in encapsulating packet 304 and then encapsulating packet 304 is transmitted through the aggregated VPN connection to communication gateway 106 in step 203.

FIG. 9 is a flowchart illustrating a process according to one of the embodiments of the present invention. When communication device 108 receives a broadcast packet in step 201, processing unit 602 determines whether the broadcast packet satisfies at least one condition in step 202. If the broadcast packet satisfies at least one condition, processing unit 602 determines to modify the TTL value of the broadcast packet in step 901 and updates the packet checksum. If the at least one condition is not satisfied, processing unit 602 does not modify the TTL value. In step 902, processing unit 602 determines whether the TTL has expired. If the TTL has expired, step 204 is performed and the broadcast packet is not forwarded. If the TTL value has not expired, processing unit 602 forwards the broadcast packet in step 203. Step 901 may be performed for modifying any other value in the broadcast packet, and is not limited to modifying the TTL value.

For illustration purpose, FIG. 9 is discussed in accordance with FIG. 1. A broadcast data, such as service advertisement 131 is sent from server 121. Service advertisement 131 may be comprised in one or more broadcast packets. The broadcast packets may be layer-2 packets, such as Ethernet frame 303. When communication gateway 108 receives Ethernet frame 303, it decapsulates IP packet 302 from Ethernet frame 303. Processing unit 602 determines in step 202 whether at least one condition is satisfied by IP packet 302. If the at least one condition is satisfied, processing unit 602 modifies the TTL value of IP packet 302 in step 901 and updates the packet checksum of IP packet 302. For example, the at least one condition may be satisfied if the TTL value is not higher than 1, and thus processing unit 602 increases the TTL value so that IP packet 302 can be forwarded through the aggregated VPN connection. In another example, the at least one condition may be based on the source IP address, destination IP address, and/or port number of IP packet 302. If the at least one condition is not satisfied, processing unit 602 does not modify the TTL value. In step 902, processing unit 602 determines whether the TTL value has expired. If the TTL has expired, step 204 is performed and IP packet 302 is not forwarded. If the TTL has not expired, IP packet 302 is first encapsulated in encapsulating packet 304 and then encapsulating packet 304 is transmitted through the aggregated VPN connection to communication gateway 106 in step 203.

The embodiments were chosen and described in order to best explain the principles of the invention and its practical applications, to thereby enable others skilled in the art to best utilize the invention and various embodiments with various modifications as are suited to the particular use contemplated.

Figure 1:
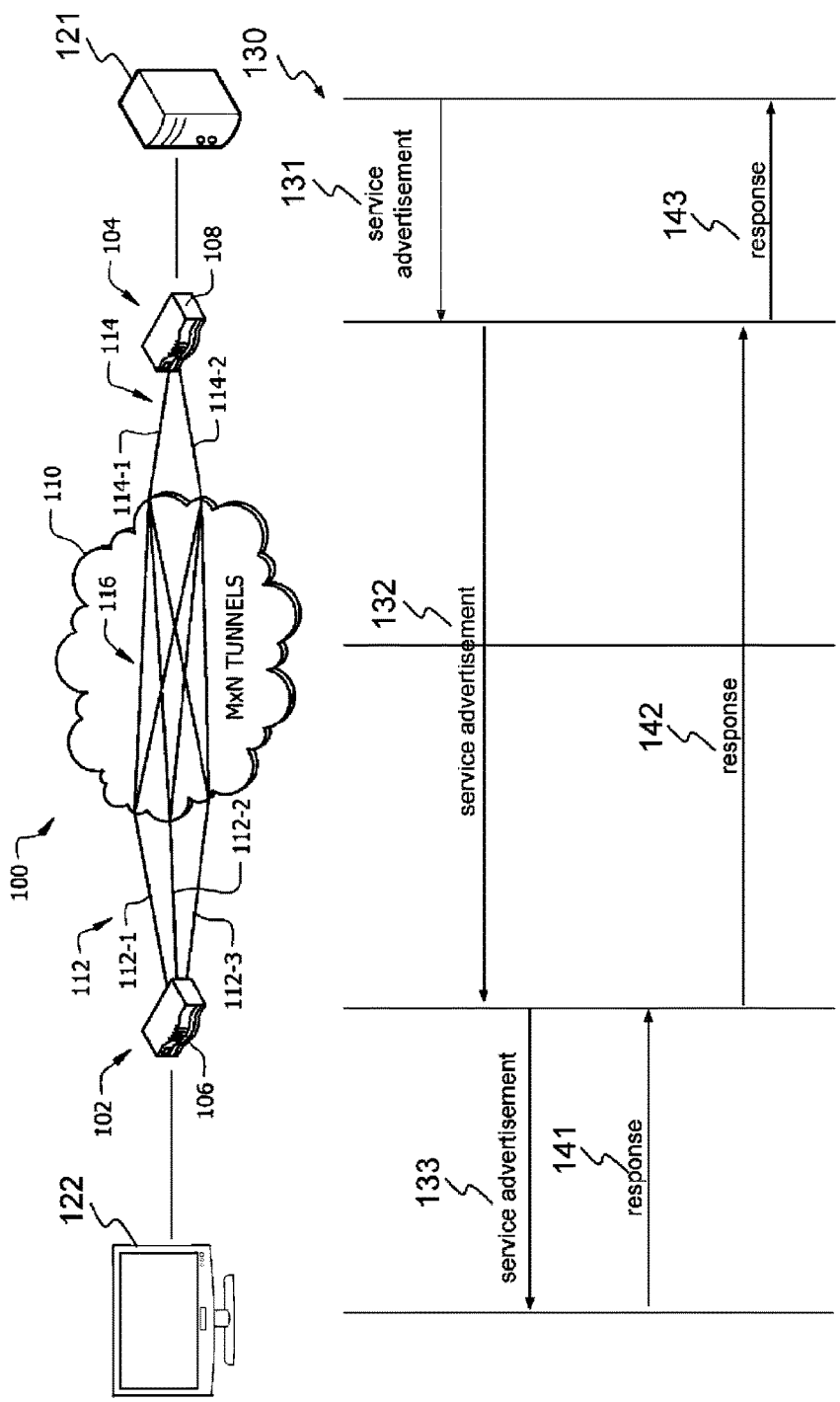
FIG. 1 illustrates a system adapted according to one of the embodiments of the present invention.
Figure 2A:
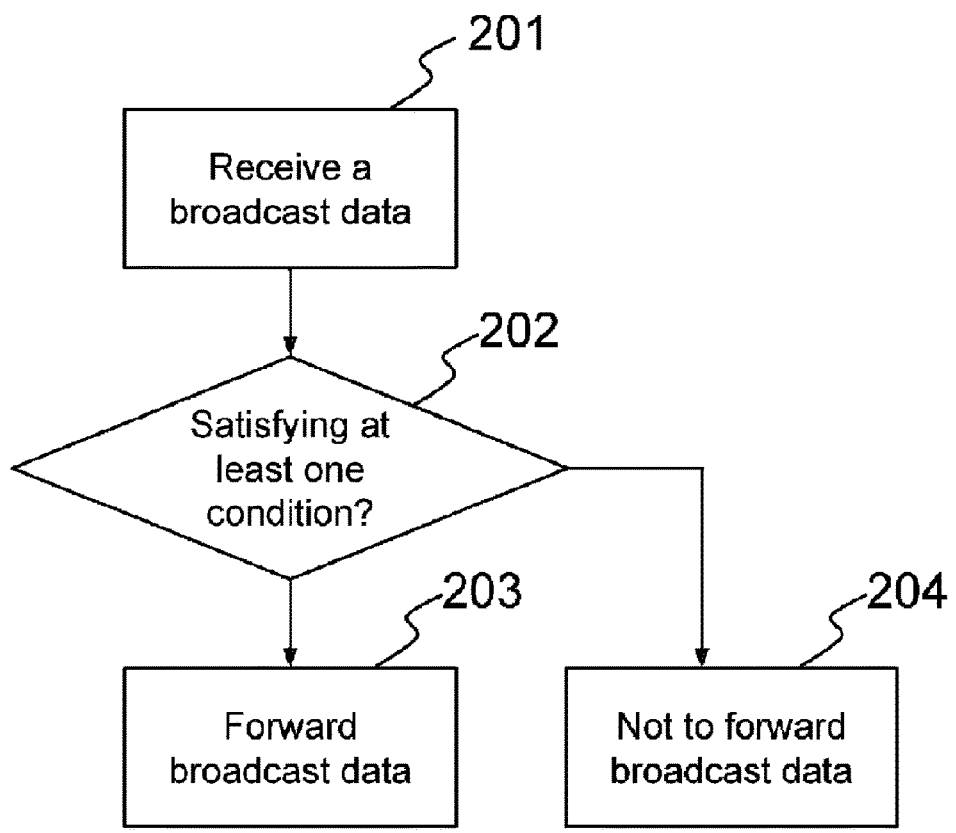
FIG. 2A is a flow-chart illustrating a process showing how a communication gateway forwards a service advertisement according to one of the embodiments.
Figure 2B:
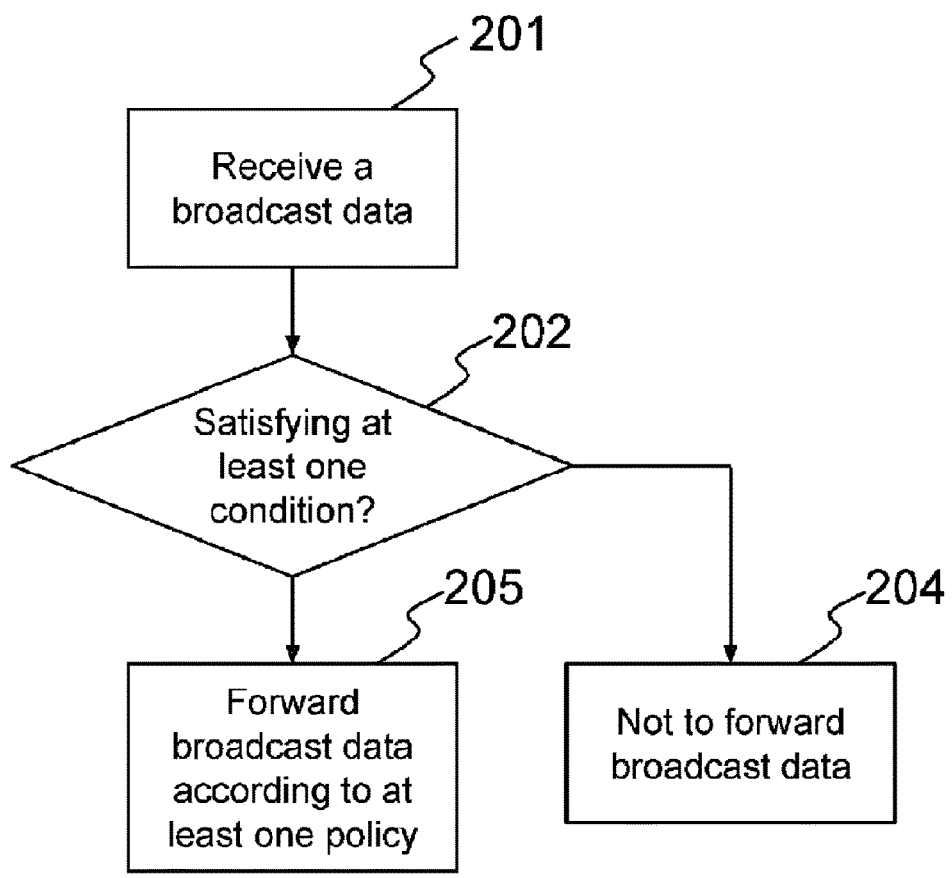
FIG. 2B is a flow-chart illustrating a process showing how a communication gateway forwards a service advertisement according to one of the embodiments.
Figure 3A:
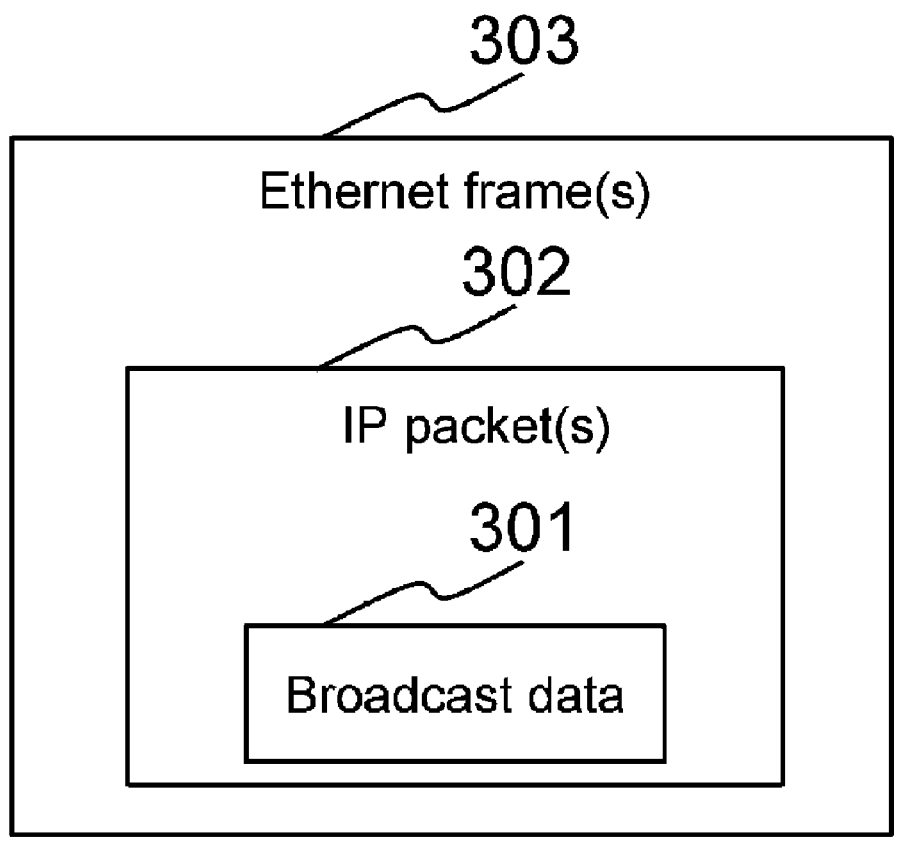
FIG. 3A illustrates structure of broadcast data according to one of the embodiments.
Figure 3B:
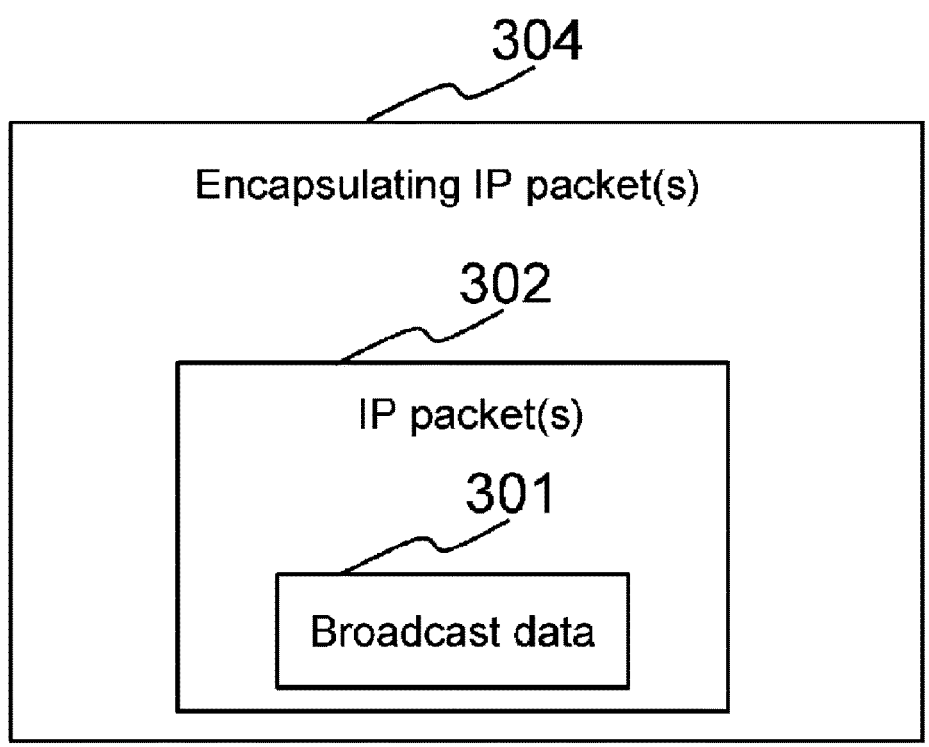
FIG. 3B illustrates structure of broadcast data according to one of the embodiments.
Figure 3C:
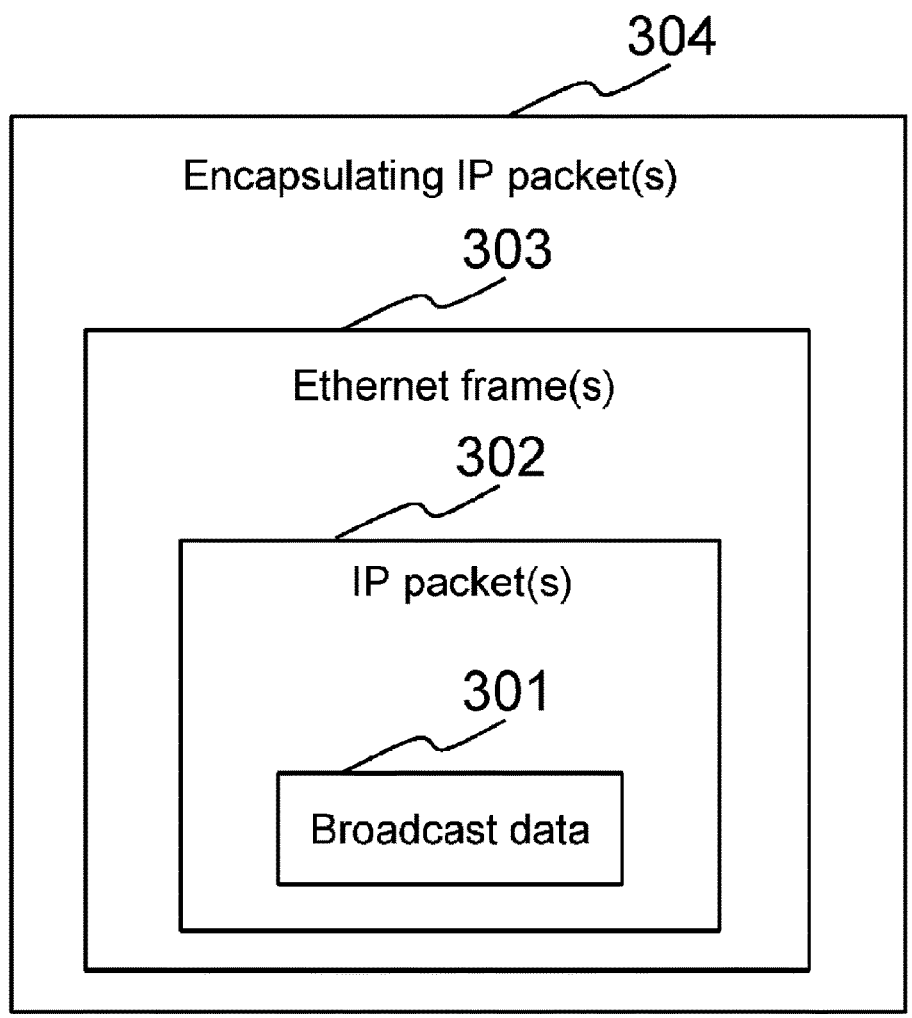
FIG. 3C illustrates structure of broadcast data according to one of the embodiments.
Figure 3D:
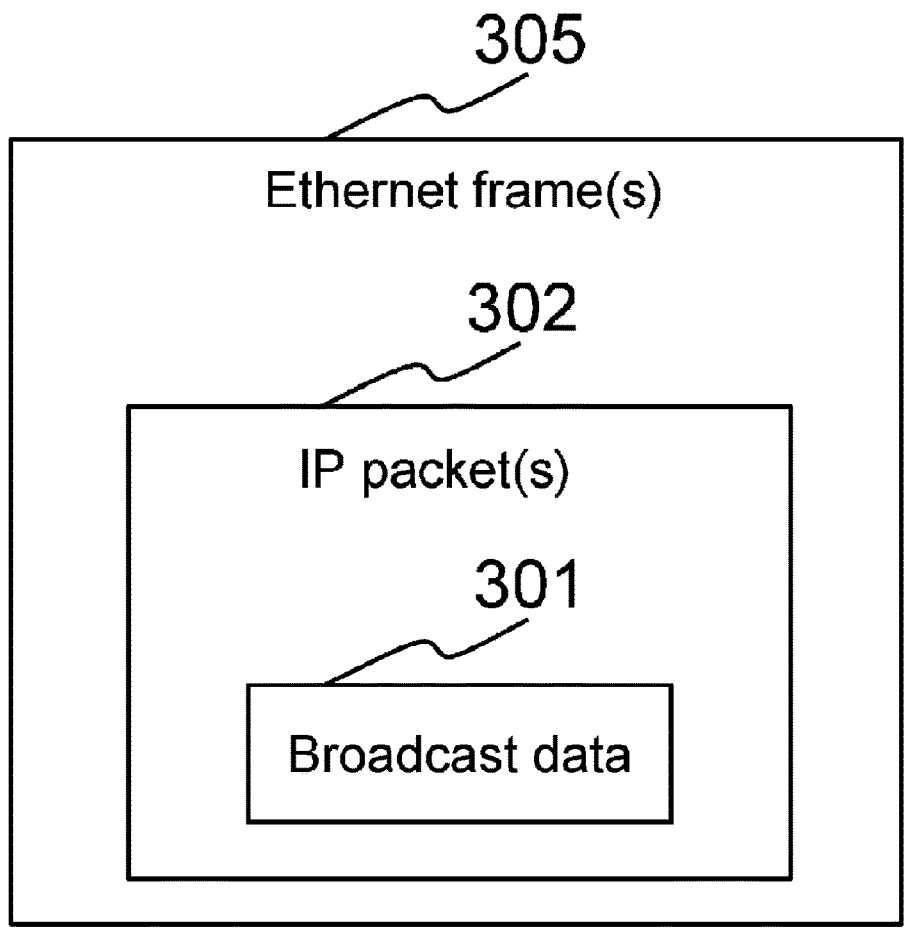
FIG. 3D illustrates structure of broadcast data according to one of the embodiments.
Figure 4:
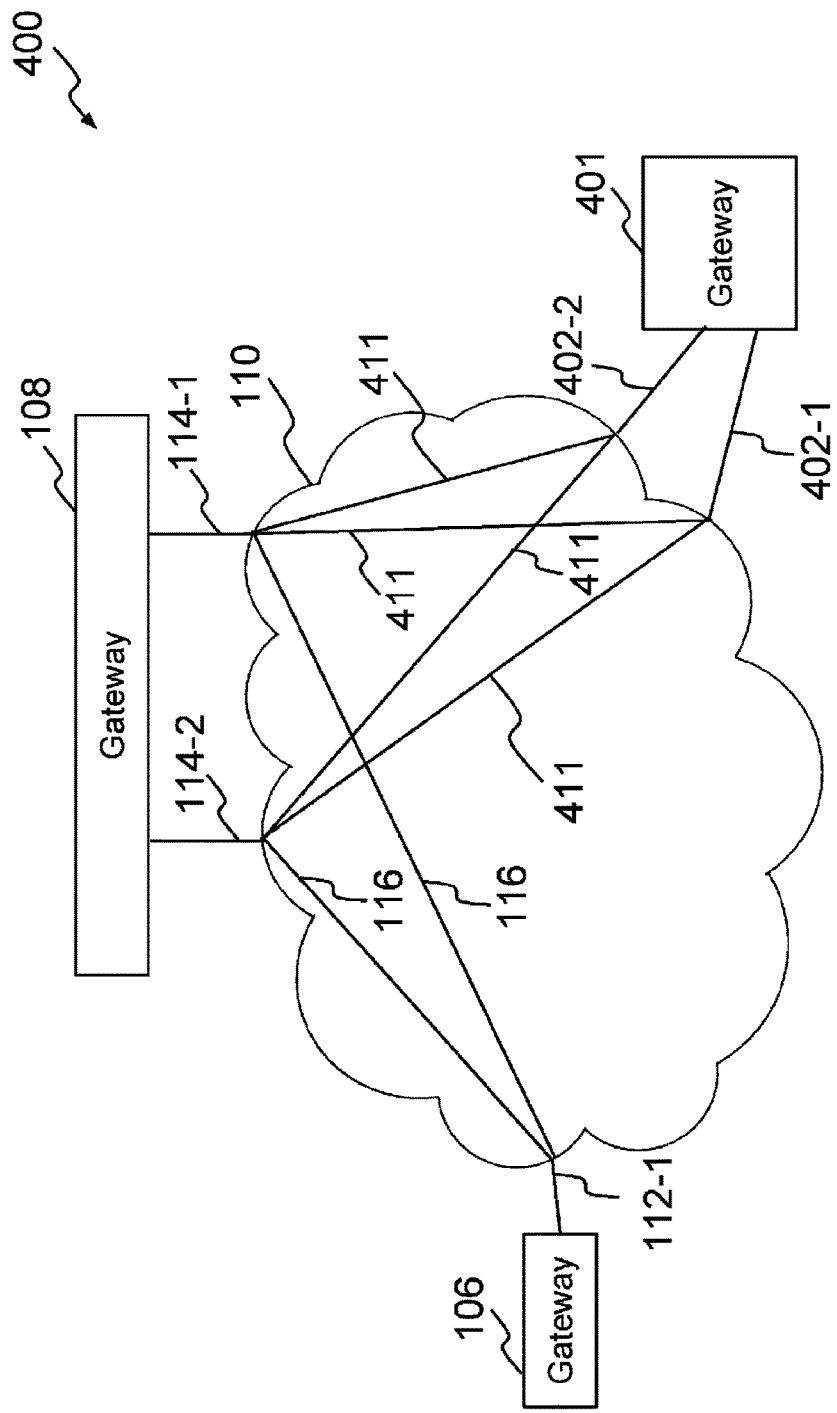
FIG. 4 illustrates a system for transmitting broadcast data adapted according to one of the embodiments of the present invention.
Figure 5:
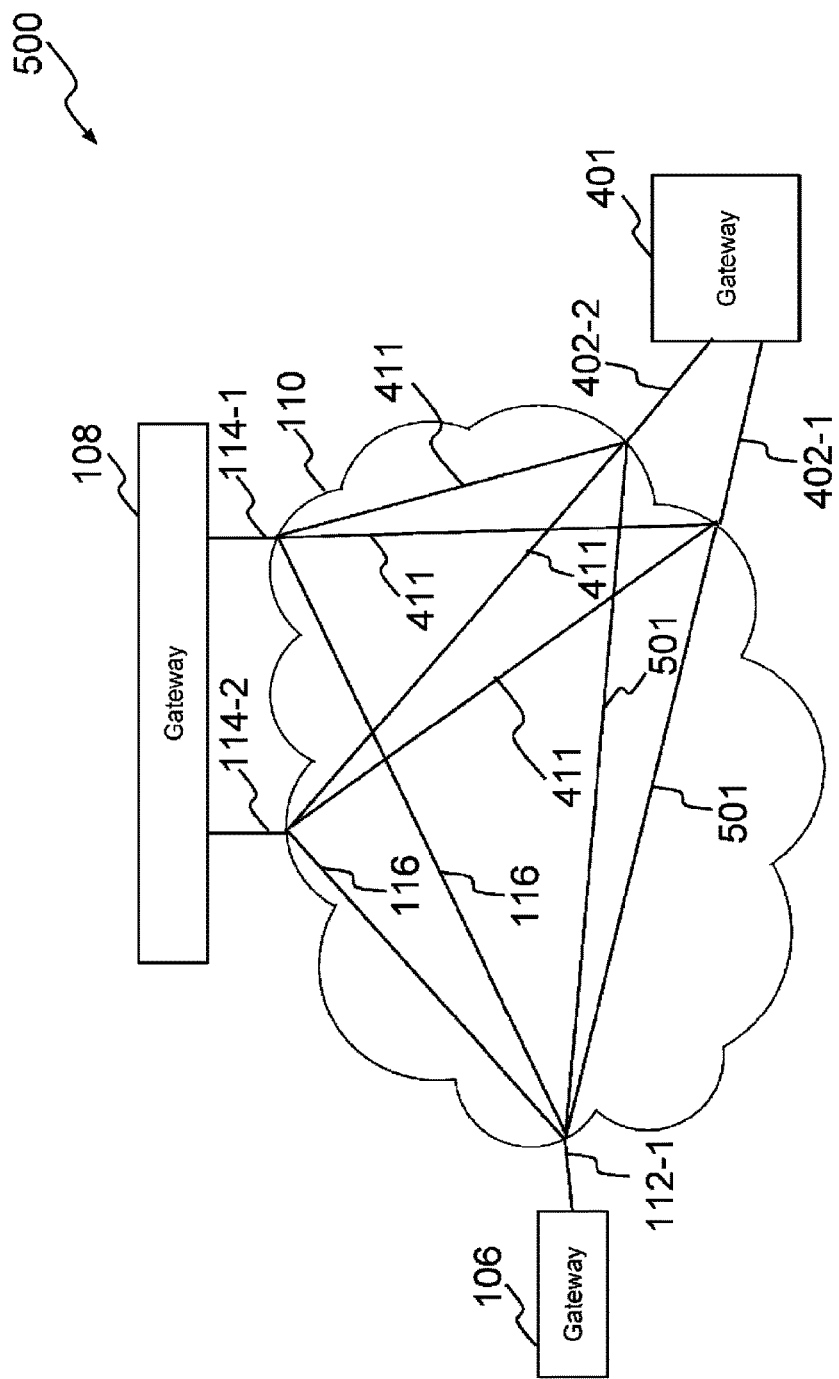
FIG. 5 illustrates a system for transmitting broadcast data adapted according to one of the embodiments of the present invention.
Figure 6:
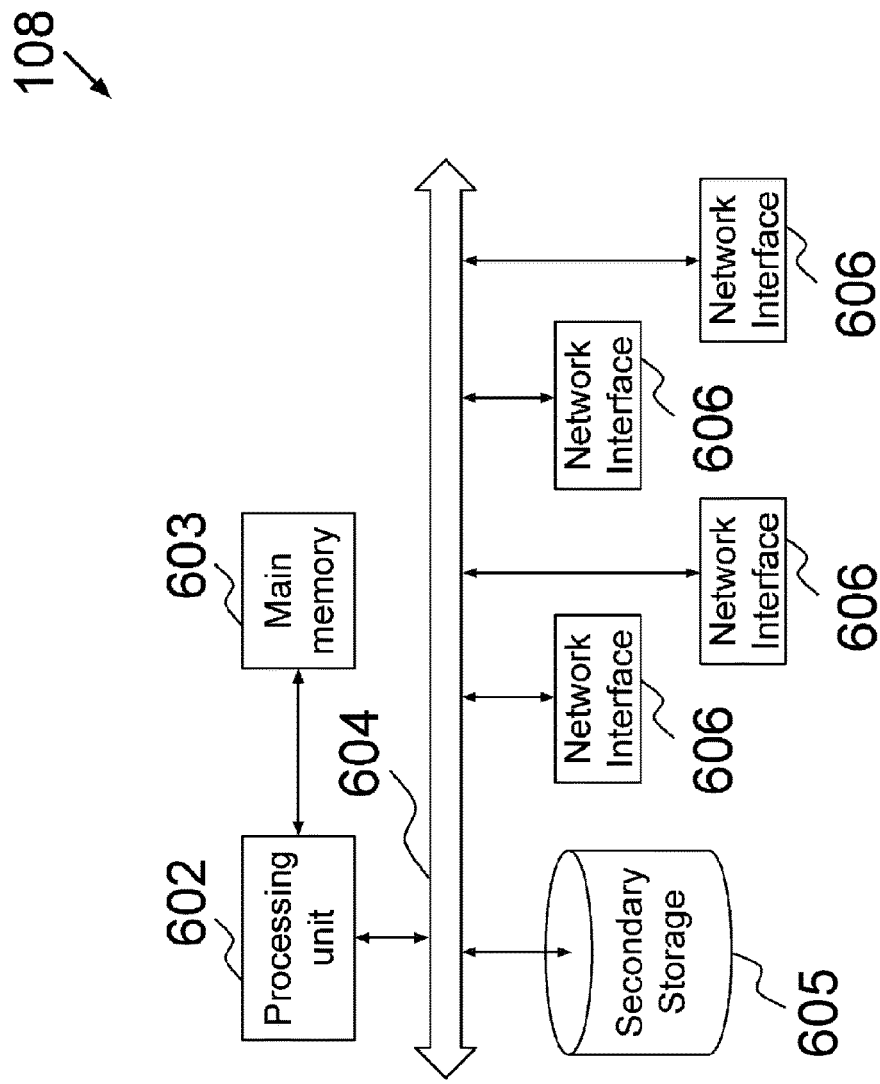
FIG. 6 is an illustrative block diagram of a communications gateway according to one of the embodiments of the present invention.
Figure 7:
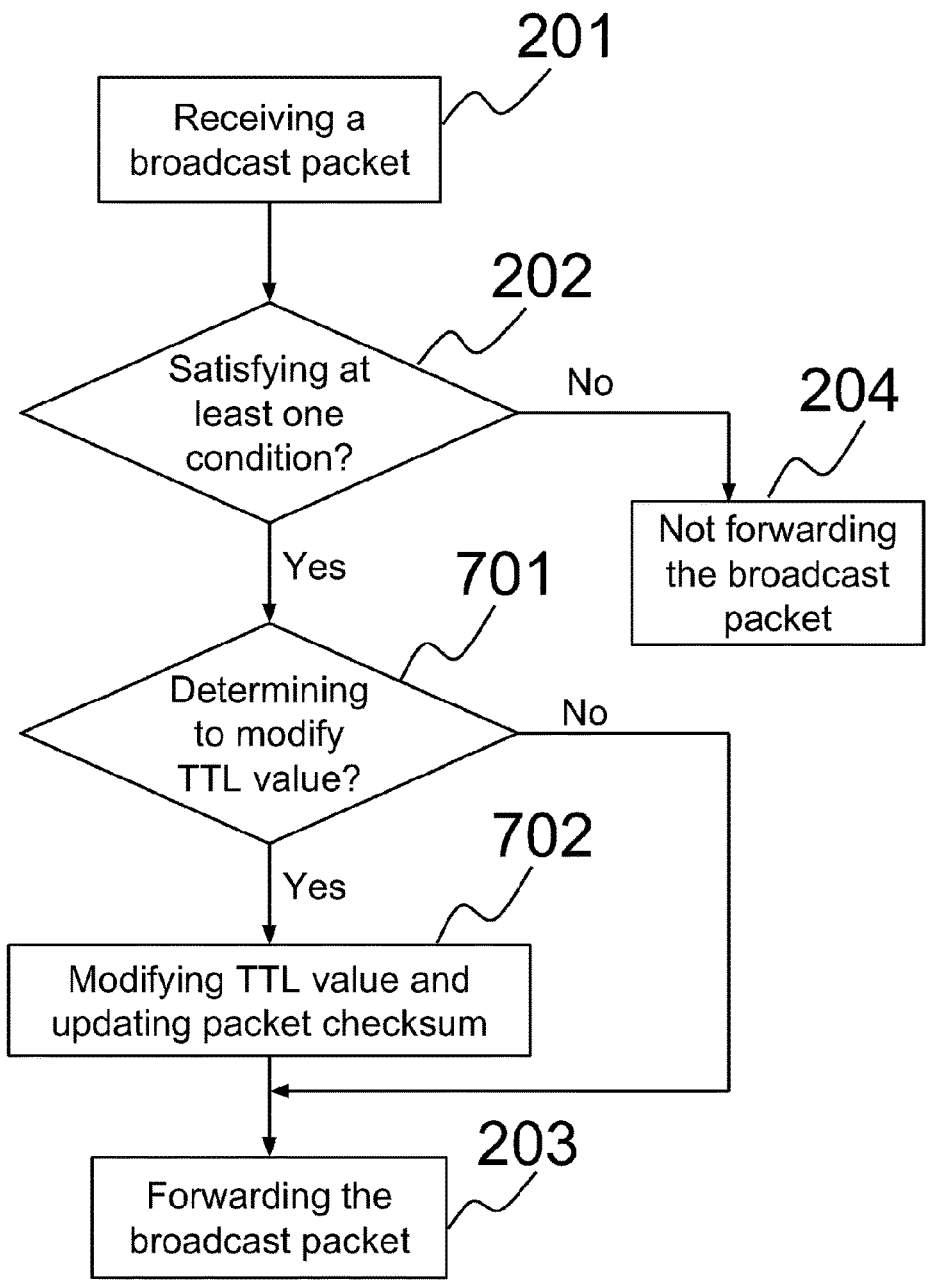
FIG. 7 is a flowchart illustrating a process for forwarding a broadcast packet according to one of the embodiments of the present invention.
Figure 8:
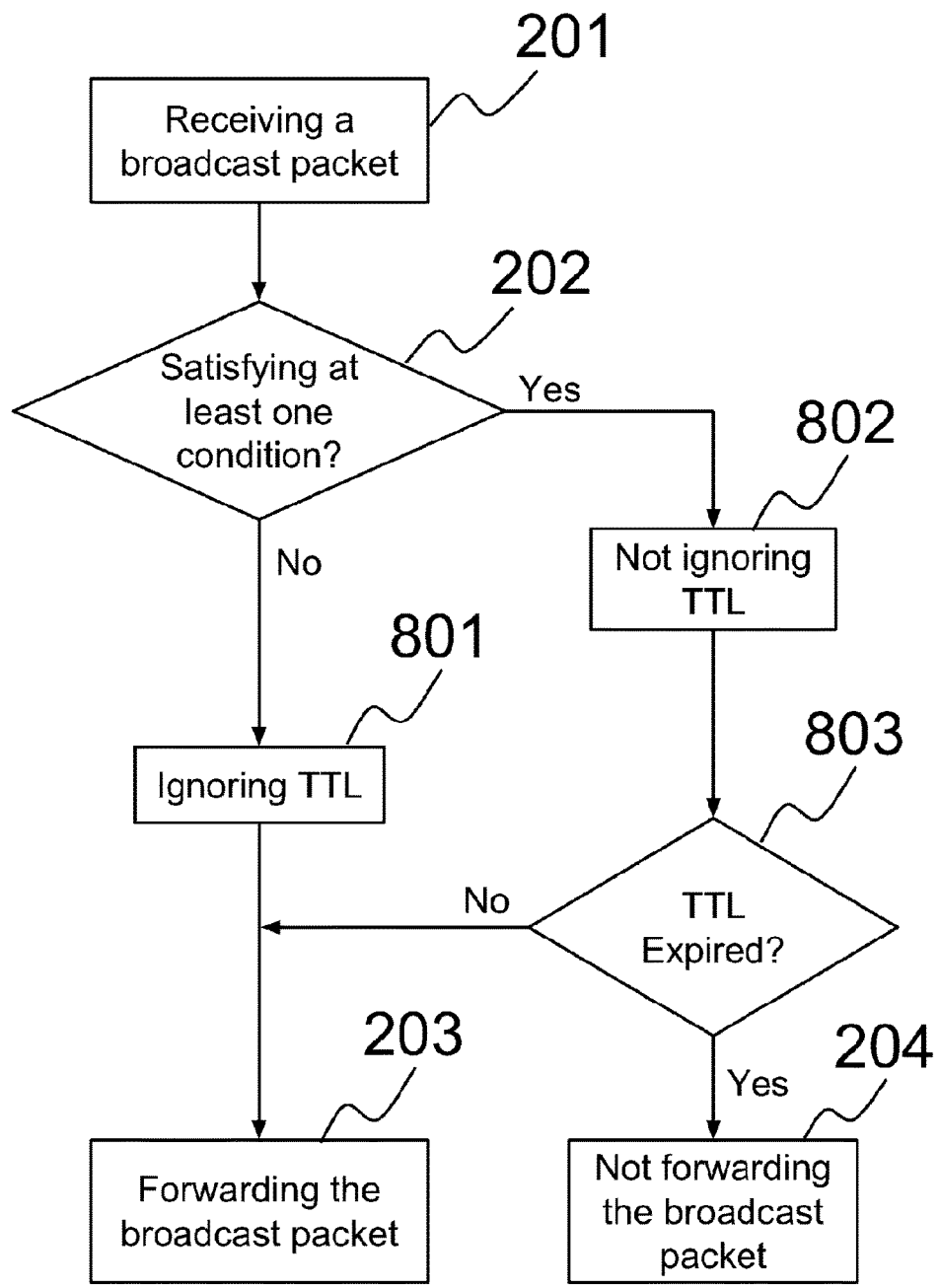
FIG. 8 is a flowchart illustrating a process for forwarding a broadcast packet according to one of the embodiments of the present invention.
Figure 9:
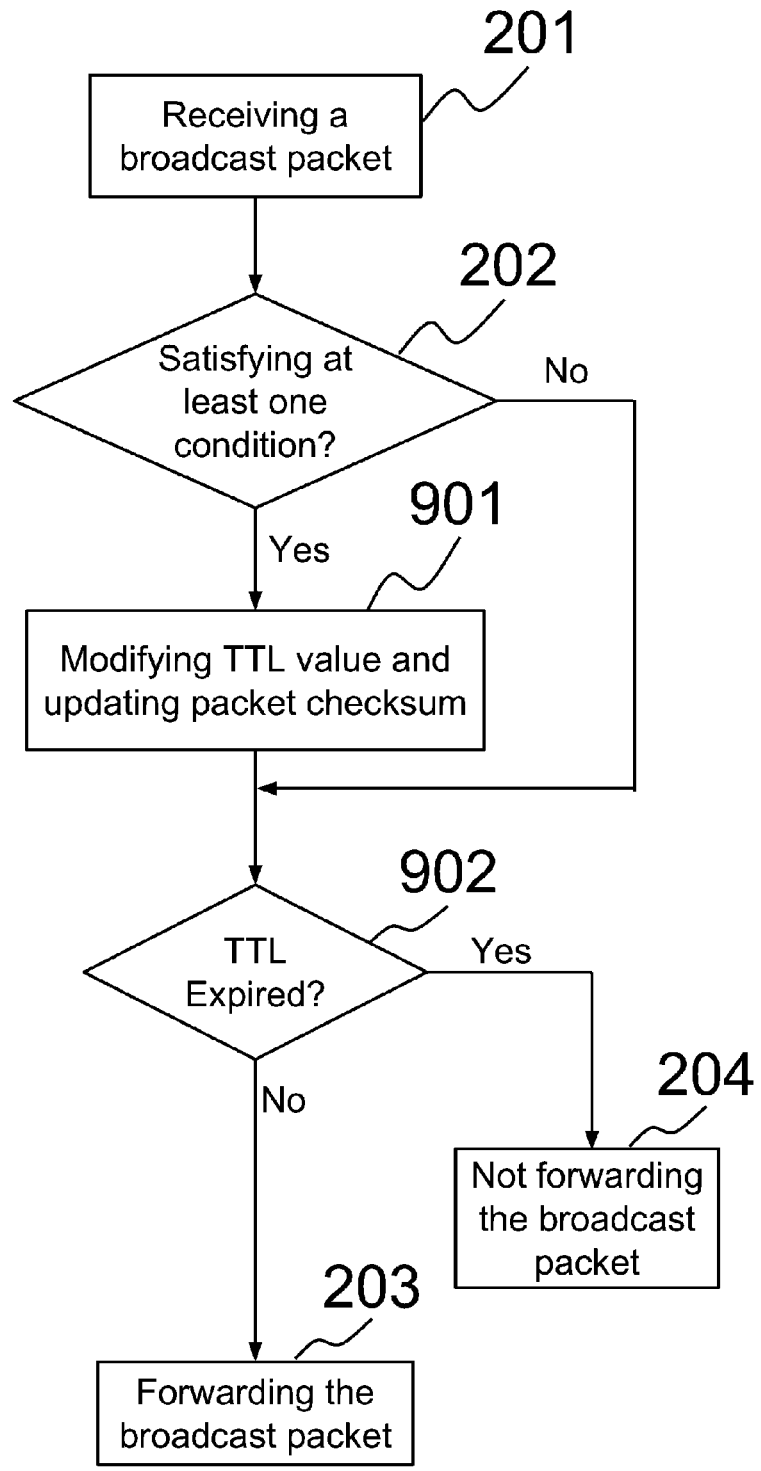
FIG. 9 is a flowchart illustrating a process for forwarding a broadcast packet according to one of the embodiments of the present invention.

The invention claimed is:

1. A method at a first communication gateway of transmitting broadcast data from a first communication gateway to a second communication gateway, comprising:
   (a) receiving a broadcast packet from a host or node, wherein the broadcast packet is a service request or a response to a service advertisement;
   (b) determining whether the broadcast packet satisfies at least one condition, wherein the at least one condition is based on one or more of source address, destination address, and port number of the broadcast packet;
when the broadcast packet satisfies the at least one condition:

(c) determining whether or not to modify a time to live (TTL) value;
(d) modifying the TTL value if determined to modify the TTL value;
(e) forwarding the broadcast packet through at least one tunnel to a destination address of the broadcast packet based on the TTL value of the broadcast packet; wherein the at least one tunnel is selected according to at least one policy; wherein the at least one policy is based on time, identity of the host or node, and/or capacity of the at least one tunnel; wherein the broadcast data is transmitted through the at least one tunnel only during a certain period of time if the at least one policy is based on time;
encapsulating the broadcast packet in an Internet Protocol (IP) packet before forwarding the broadcast packet to the destination address in step (e), and wherein the broadcast packet is a Boniour protocol based packet;
wherein a plurality of tunnels are established between the first communication gateway and the second communication gateway; and
wherein the at least one tunnel is selected from the plurality of tunnels; and wherein the destination address is reachable through an interconnected network.

2. The method of claim 1, wherein the at least one policy is further based on a priority of the broadcast packet.

3. The method of claim 1, wherein the plurality of tunnels are classified into a first group of tunnels and a second group of tunnels; and wherein the first group of tunnels is used for transmitting broadcast data and the second group of tunnels is used for transmitting unicast data.

4. The method of claim 1, wherein step (d) is performed if TTL of the broadcast packet has expired or is about to be expired.

5. The method of claim 1, further comprising modifying other fields of the broadcast packet before performing step (e) if the broadcast packet satisfies the at least one condition.

6. The method of claim 5, wherein the other fields comprising at least one of destination address and source address of the broadcast packet.

7. The method of claim 1, wherein the forwarding is performed through an aggregated virtual private network (VPN) connection.

8. A method at a first communication gateway of transmitting broadcast data from a first communication gateway to a second communication gateway:
(a) receiving a broadcast packet from a host or a node, wherein the broadcast packet is a service request or a response to a service advertisement;
(b) determining whether the broadcast packet satisfies at least one condition, wherein the at least one condition is based on one or more of source address, destination address, and port number of the broadcast packet;
when the broadcast packet does not satisfy the at least one condition:
(c) forwarding the broadcast packet through at least one tunnel to a destination address regardless of TTL value of the broadcast packet; wherein the at least one tunnel is selected according to at least one policy; wherein the at least one policy is based on time, identity of the host or node, and/or capacity of the at least one tunnel; wherein the broadcast data is transmitted through the at least one tunnel only during a certain period of time if the at least one policy is based on time;
when the broadcast packet satisfies the at least one condition:
(d) determining whether or not TTL of the broadcast packet has expired;
(e) forwarding the broadcast packet if the TTL of the broadcast packet has not expired;
encapsulating the broadcast packet in an Internet Protocol (IP) packet before forwarding the broadcast packet to the destination address in step (e), and wherein the broadcast packet is a Boniour protocol based packet;
(f) not forwarding the broadcast packet if the TTL of the broadcast packet has expired;
wherein a plurality of tunnels are established between the first communication gateway and the second communication gateway; and
wherein the at least one tunnel is selected from the plurality of tunnels.

9. A first communication gateway configured to transmit broadcast data to a second communication gateway comprising:
a plurality of network interfaces; at least one processing unit;
at least one main memory;
at least one secondary storage storing program instructions executable by the at least one processing unit for:
(a) receiving a broadcast packet from a host or node, wherein the broadcast packet is a service request or a response to a service advertisement;
(b) determining whether the broadcast packet satisfies at least one condition; wherein the at least one condition is based on one or more of source address, destination address, and port number of the broadcast packet;
when the broadcast packet satisfies the at least one condition:
(c) determining whether or not to modify a time to live (TTL) value;
(d) modifying the TTL value if determined to modify the TTL value;
(e) forwarding the broadcast packet through at least one tunnel to a destination address of the broadcast packet based on the TTL value of the broadcast packet; wherein the at least one tunnel is selected according to at least one policy; wherein the at least one policy is based on time, identity of the host or node, and/or capacity of the at least one tunnel; wherein the broadcast data is transmitted through the at least one tunnel only during a certain period of time if the at least one policy is based on time;
encapsulating the broadcast packet in an IP packet before forwarding the broadcast packet to the destination address in step (e), and wherein the broadcast packet is a Boniour protocol based packet;
wherein a plurality of tunnels are established between the first communication gateway and the second communication gateway;
wherein the at least one tunnel is selected from the plurality of tunnels; and
wherein the destination address is reachable through an interconnected network.

10. The communication gateway of claim 9, wherein the at least one policy is further based on a priority of the broadcast packet.

11. The communication gateway of claim 9, wherein the plurality of tunnels are classified into a first group of tunnels and a second group of tunnels; and wherein the first group of tunnels is used for transmitting broadcast data and the second group of tunnels is used for transmitting unicast data.

12. The communication gateway of claim 9, wherein step (d) is performed if TTL of the broadcast packet has expired or is about to be expired.

13. The communication gateway of claim 9, wherein the secondary storage further stores program instructions for modifying other fields of the broadcast packet before performing step (e), if the broadcast packet satisfies the at least one condition.

14. The communication gateway of claim 13, wherein the other fields comprise at least one of destination address and source address of the broadcast packet.

15. The communication gateway of claim 9, wherein forwarding is performed through an aggregated virtual private network (VPN) connection.

* * * * *